United States Patent [19]

Appiano et al.

[11] Patent Number: 4,639,861
[45] Date of Patent: Jan. 27, 1987

[54] INTERFACE CONTROLLING BIDIRECTIONAL DATA TRANSFER BETWEEN A SYNCHRONOUS AND AN ASYNCHRONOUS BUS

[75] Inventors: Silvano Appiano, Montafia d'Asti; Paolo Destefanis; Cesare Poggio, both of Turin, all of Italy

[73] Assignee: CSELT Centro Studi e Laboratori Telecomunicazioni S.p.A., Turin, Italy

[21] Appl. No.: 572,579

[22] Filed: Jan. 20, 1984

[30] Foreign Application Priority Data

Jan. 21, 1983 [IT] Italy ............................. 67070 A/83

[51] Int. Cl.$^4$ ............................................. G06F 15/46
[52] U.S. Cl. ................................................ 364/200
[58] Field of Search ... 364/200 MS File, 900 MS File

[56] References Cited

U.S. PATENT DOCUMENTS

| | | | |
|---|---|---|---|
| 3,558,811 | 1/1971 | Montevecchio et al. | 364/900 |
| 3,825,901 | 7/1974 | Golnek, Sr. et al. | 364/200 |
| 4,218,740 | 8/1980 | Bennett et al. | 364/200 |
| 4,366,535 | 12/1982 | Cedolin et al. | 364/200 |
| 4,379,327 | 5/1983 | Tietjen et al. | 364/200 |

FOREIGN PATENT DOCUMENTS 2099619  12/1982  United Kingdom .

OTHER PUBLICATIONS

K. A. El-Ayat, *The Intel 8089: An Integrated I/O Processor*, Computer, vol. 12, No. 6, Jun. 1979.
J. P. Barthmaier, *Multiprocessing System Mixes 8- and 16-Bit Microcomputers*, Computer Design, vol. 19, No. 2, Feb. 1980.
Communications from European Patent Office, dated 13 Jun. 1984, (listing cited references), and dated 4 Mar. 1986, (Office Action).

*Primary Examiner*—Thomas M. Heckler
*Assistant Examiner*—Daniel K. Dorsey
*Attorney, Agent, or Firm*—Karl F. Ross; Herbert Dubno

[57] ABSTRACT

An interface facilitating data transmission between a control processor, connected to an asynchronous two-way bus, and a plurality of terminals, connected to a common synchronous two-way bus, comprises a microprocessor responsive to periodically recurring access requests from the several terminals. The access requests are short pulses with a recurrence period greatly exceeding their duration, this period being nominally equal for all terminals and sufficient to accommodate one data transfer to or from each terminal with time remaining for execution of part of a main program performed by the control processor. Coinciding access requests from different terminals are handled according to a predetermined order of priority. The exchange of data takes place by way of a data memory and a buffer memory linked by an internal two-way bus. Data transfer between the control processor and a terminal takes place in three stages, i.e. between the processor and the buffer memory, between the buffer memory and the data memory, and between the data memory and the terminal. Except during the second stage, the processor has always access to the buffer memory.

3 Claims, 4 Drawing Figures

INTERFACE CONTROLLING BIDIRECTIONAL DATA TRANSFER BETWEEN A SYNCHRONOUS AND AN ASYNCHRONOUS BUS

FIELD OF THE INVENTION

Our present invention relates to an interface designed to facilitate, in a telecommunication or other data-handling system, an exchange of data between a processing unit and a plurality of terminals dialoguing therewith, the processing unit carrying out a series of operations—referred to hereinafter as a main program in a temporally uncorrelated manner while each terminal emits a periodically recurring access request. Thus, the processing unit communicates with the interface via a two-way connection which may be termed an asynchronous bus while another two-way connection, termed a synchronous bus, links the several terminals with the interface.

BACKGROUND OF THE INVENTION

Commonly owned U.S. Pat. No. 4,347,608 discloses a selfchecking system for electronic processing equipment in which a central processor controls a set of peripheral units through an associated logic network. The processor is programmed to activate from time to time, through a direct connection which bypasses the logic network, a checking unit wherein a read-only memory stores various microprograms in areas individually addressable by the processor. Thus, the processor monitors the operation of the checking unit in the course of a diagnostic program during which the performance of the logic network is also tested.

In many instances, terminals or peripheral units connected thereto have their own time bases enabling each terminal to transmit and/or receive data at least once during a predetermined recurrence period. An interface such as the aforementioned logic network must then be able to handle the periodically recurring access requests from the several terminals, arriving over the common synchronous data bus, along with similar but irregularly occurring requests coming from the asynchronous bus associated with the processing unit whose main program may or may not be of the diagnostic type discussed in the prior patent. An important task of the interface, therefore, is to avoid collisions between access requests from different sources and to allocate time for the data transfer which is to follow such a request.

If the recurrence periods of the access requests from the several terminals are mutually different, the shortest period should still be sufficient for a data transmission to or from each terminal over the common synchronous bus, as well as from or to the processor on the asynchronous bus, while also allowing part of the main program to be executed. Usually, though, the several time bases are provided with crystal-controlled oscillators tuned to the same nominal frequency so that their various recurrence periods are substantially identical. In theory, therefore, it is possible to stagger these recurrence periods so as to prevent a coincidence of the access requests which are in the form of short pulses whose duration is a small fraction of such a period. However, mutually independent oscillators cannot indefinitely maintain such a staggered relationship but are subject to relative frequency drifts due, for example, to thermal causes. In certain situations, as where the terminals form part of a message-transmitting system using a communications satellite, Doppler shifts will also be a factor; especially in such a communication system the recurrence period may be on the order of 500 $\mu$s or less, allowing only a minor fraction of that time for data transfer from or to a given terminal even if only two terminals are connected to the common synchronous bus.

OBJECT OF THE INVENTION

Thus, the object of our present invention is to provide an interface for the purpose described which satisfies the aforestated requirements in a system with one or more pairs of terminals dialoguing with a processing unit.

SUMMARY OF THE INVENTION

In accordance with our present invention, an interface in a data-handling system of the above-discussed type comprises receiving means connected to the synchronous bus for detecting access requests from any terminal associated therewith. The interface further comprises memory means accessible to the processing unit for temporarily storing data to be transferred from or to any of the terminals, decision means connected to the receiving means for establishing an order of succession among simultaneously arriving access requests from several of these terminals, and microprocessing means connected to the receiving means and to the memory means for controlling, during a fraction of a recurrence period following the arrival of an access request from a given terminal, a data transfer between that terminal and the memory means.

More particularly, in accordance with a preferred embodiment described hereinafter, the memory means comprises two separate storage facilities, namely a data memory connected to a two-way internal bus and a buffer memory which is switchable to that internal bus and to the asynchronous bus under the control of the microprocessing means and the processing unit. The internal bus is connected to the microprocessing means and, under the control of the latter, is switchable to the synchronous bus to enable data transfer in either direction between these two buses.

Advantageously, each of the three buses referred to has multiple leads for bidirectional parallel transmission of the bits of multibit data words being transferred. This also applies, in part, to other internal connections of the interface which can therefore be regarded as being of the parallel-operating type.

BRIEF DESCRIPTION OF THE DRAWING

The above and other features of our invention will now be described in detail with reference to the accompanying drawing in which.

SPECIFIC DESCRIPTION

Figure 1:
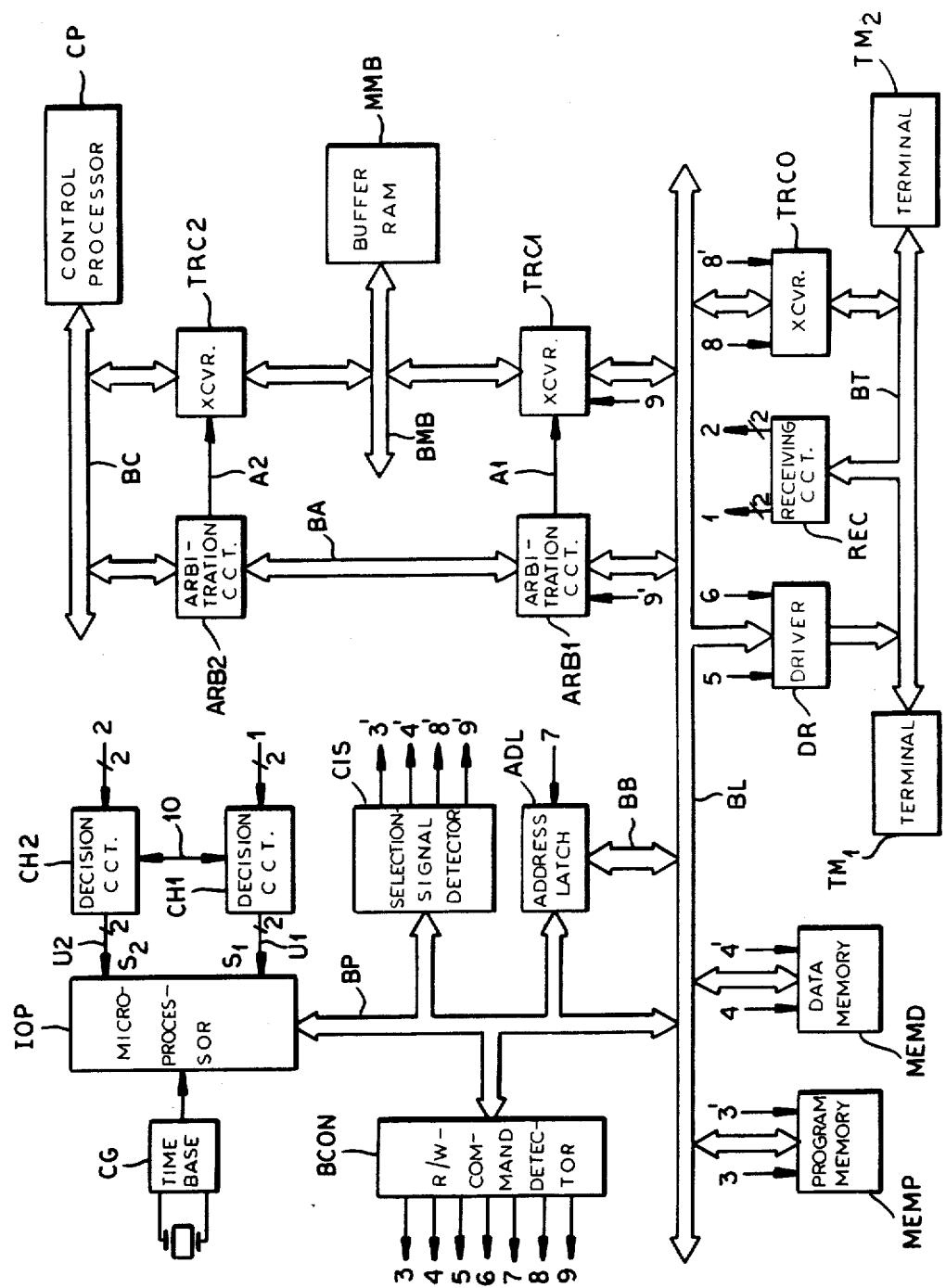
FIG. 1 is a block diagram of an interface embodying our invention.

In FIG. 1 we have shown a processing unit CP, referred to hereinafter as a control processor, and a pair of terminals $TM_1$, $TM_2$ dialoguing with that control processor through an interface according to the present invention. Processor CP is connected to a bidirectional asynchronous bus BC while terminals $TM_1$ and $TM_2$ communicate with a common bidirectional synchronous bus BT. The latter bus is connected to a receiving circuit REC with two pairs of output leads 1 and 2. These two pairs of leads terminate at respective decision circuits CH1 and CH2 connected by output leads U1 and U2 to a microprocessor IOP. The latter is stepped by a time base CG comprising a crystal-controlled oscillator; similar time bases, not shown, are included in terminals $TM_1$ and $TM_2$.

Bus BT contains a multiplicity of wires common to both terminals, designed to carry address and data bits to and from either terminal, as well as additional leads individual to each terminal feeding periodic access requests to receiving circuit REC. Each access request, in the form of a short pulse $S_1$ or $S_2$ on one of the leads of the pair 1 or 2 and its extension $U_1$ or $U_2$, is accompanied by a binary signal (high or low level) on the other lead of the pair indicating whether the request is for writing or for reading, i.e. for the emission of the acquisition of data by the requesting terminal. Decision circuits CH1 and CH2, interconnected by a link 10, prevent microprocessor IOP from having to handle two access requests at the same time. Thus, each of these circuits informs the other that a request pulse is being transmitted through it to the microprocessor, causing a delay in the transmission of a similar pulse thereafter arriving at the other circuit. If pulses $S_1$ and $S_2$ should appear simultaneously, preference is given to pulse $S_1$ which thus reaches the microprocessor IOP before pulse $S_2$. The operation of the microprocessor in response to these request pulses will be more fully described hereinafter with reference to FIG. 2.

Components IOP, CH1 and CH2 may be incorporated in an integrated-circuit chip such as one of type 8089 manufactured by Intel Corp. of Santa Clara, Calif.

An internal bidirectional bus BL has a branch BP communicating with microprocessor IOP. Buses BP and BL form part of a connection through which microprocessor IOP can communicate with bus BC and thus with control processor CP, this connection further including two arbitration circuits ARB1, ARB2 and an intervening link BA. Components ARB1, ARB2, whose functions will be described hereinafter, may be implemented by a chip 8289 manufactured by Intel Corp.

Reading and writing commands emitted by the microprocessor on collateral bus BP are detected by a component BCON provided with a number of output leads 3–9. Another signal detector CIS, also connected to bus BP, discriminates among several instructions from the microprocessor selectively activating—by way of respective output leads 3', 4', 8', 9' of that detector—four further components or chips connected to internal bus BL, namely a program memory MEMP, a data memory MEMD, a driver DR and a transceiver TRCO. A further circuit ADL, which may be termed an address latch, is connected to a unidirectional extension of bus BP and communicates with bus BL through a bidirectional link BB for detecting addresses appearing on either of these buses and storing them in response to a writing command present on output lead 7 of detector BCON. A reading command on that lead unloads a stored address onto wires of bus BL differing from those carrying data emitted by microprocessor IOP via bus BP. Addresses and data delivered by the microprocessor pass over the same wires of bus BP but at different times.

Memory MEMP is of the programmable read-only type and emits stored microinstructions, from cells whose addresses appear on bus BL, in response to a reading command on lead 3 accompanying a selection signal on lead 3'. These microinstructions identify an area of a memory in terminal $TM_1$ or $TM_2$ to be read or written at a given time and also specify the number of bytes involved in such a transfer. If necessary, the contents of memory MEMP can be modified—temporarily or for an indefinite period—under the control of processor CP in the course of normal operation; such modification requires the coincidence of a selection signal on lead 3' with a writing command on lead 3.

Memory MEMD is of the random-access type and can be read or written, in response to a corresponding command on lead 4 coinciding with a selection signal on lead 4', to receive or emit data via bus BL at cells also identified by words present on the address leads of that bus.

Driver DR, connected to these address leads, is activated by a writing command on lead 5 or 6 to identify a memory area of terminal $TM_1$ or $TM_2$, respectively, to be involved in a data transfer. Such a transfer takes place by way of transceiver TRCO which is activated by a selection signal on lead 8', the state of energization of lead 8 indicating the direction in which the data bits are to pass between buses BT and BL.

Two similar transceivers TCR1 and TCR2 are operable to connect a buffer memory MMB of the random-access type, via an ancillary bidirectional bus BMB, to bus BL or BC, respectively. Circuit ARB1, when activated by a selection signal on lead 9', energizes an output lead A1 to activate the transceiver TRC1 for address and data transmission between buses BL and BMB in a direction determined by the binary signal on lead 9. In a similar manner, circuit ARB2 can activate the transceiver TRC2 by a signal on an output lead A2 for enabling an exchange of addresses and data between buses BC and BMB; the activation and the transfer direction are controlled in this instance by signals which the processor CP may emit via bus BC at irregular intervals. Circuits ARB1 and ARB2 intercommunicate through a bidirectional link BA to prevent a simultaneous switching of bus BMB to buses BC and BL; if activation of circuit ARB1 by a command on lead 9' coincides with an attempt on the part of processor CP to gain access to memory MMB, circuit ARB2 is blocked by way of link BA as long as that memory is seized by microprocessor IOP. Such blocking, however, will not become effective until a microinstruction from the programmer of processor CP, in progress upon the arrival of the selection signal on lead 9', has been fully executed.

At all other times, even when data are being transferred on bus BL between either terminal and memory MEMD, control processor CP can dialogue with buffer memory MMB by way of transceiver TRC2. Data loaded into that memory by the processor can then be transferred to memory MEMD, or possibly directly to the terminal of their destination, under the control of microprocessor IOP during a time interval reserved for execution of part of the main program, i.e. when no data transfer takes place between a terminal and memory MEMD. Such a time interval is also available for the transmission of data intended for processor CP, again under the control of microprocessor IOP, to buffer memory MMB from memory MEMD or possibly directly from an originating terminal. The intervention or nonintervention of data memory MEMD in such a multistage transfer between processor CP and one of the terminals is determined by instructions sent from the processor to unit IOP by way of circuits ARB1, ARB2 and buses BA, BL and BP.

The combination of components ARB1, ARB2, TRC1, TRC2 and MMB, enabling asynchronous bidirectional data transfer between buses BL and BC, forms an assembly of the type termed biport memory in the art.

Figure 2:
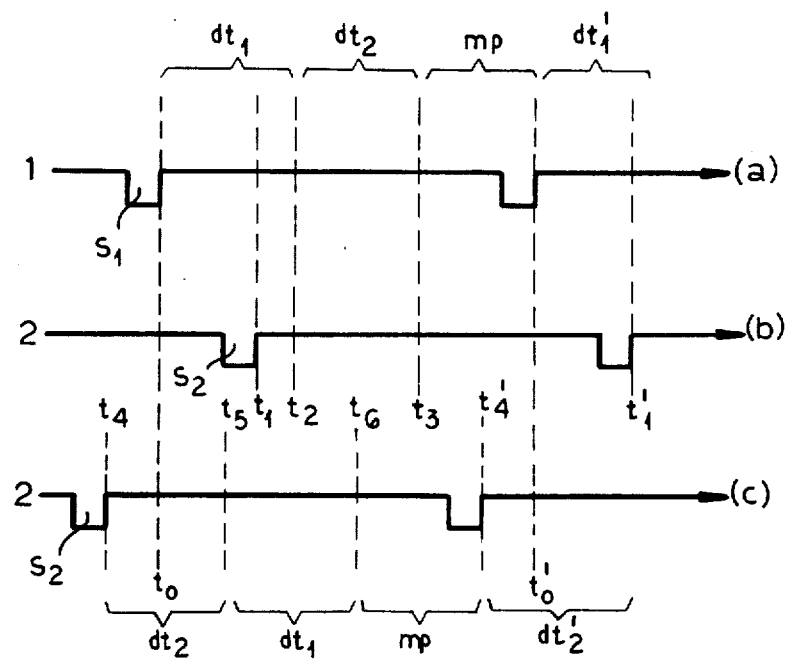
FIG. 2 is a set of graphs relating to the operation of the interface of FIG. 1.

Reference will now be made to FIG. 2 showing different relative time positions of access requests $S_1$ and $S_2$ respectively generated by terminals $TM_1$ and $TM_2$. These access requests, as seen in the graphs of FIG. 2, are short low-level pulses interrupting a normal high signal level on the corresponding leads. Graph (a) shows pulses $S_1$ as lasting for a small fraction of their recurrence period which may have a length of 500 μs, for example. Access requests $S_2$, shown in graphs (b) and (c), are similar pulses with substantially the same recurrence peirod. In graph (b) the pulses $S_2$ on a lead 2 trail the pulses $S_1$ on a lead 1 whereas in graph (c) they occur slightly ahead of the latter.

When pulses $S_2$ appear in the first half of the recurrence period of pulses $S_1$, as indicated in graph (b), the trailing edge of a pulse $S_1$ occurring at an instant $t_0$ initiates an interval $dt_1$ for data transfer (reading or writing) between terminal $TM_1$ and memory MEMD. With the relative timing indicated in graphs (a) and (b), this transfer interval lasts beyond an instant $t_1$ corresponding to the trailing edge of a pulse $S_2$. Microprocessor IOP will therefore delay a data transfer requested by pulse $S_2$, involving terminal $TM_2$, until the end of interval $dt_1$ at an instant $t_2$ which marks the start of a data-transfer interval $dt_2$ of the same or different duration ending at an instant $t_3$. In any event, the sum of the two transfer intervals should be less than the recurrence period of pulses $S_1$ to leave an interval mp, between instant $t_3$ and the start of a new interval $dt_1'$ at an instant $t_0'$, for execution of part of the main program.

If, on the other hand, pulses $S_2$ appear in the second half of a recurrence period of pulses $S_1$, as shown in graph (c), transfer interval $dt_2$ starts at an instant $t_4$ preceding the arrival of a pulse $S_1$. A transfer interval $dt_1$ requested by the latter pulse will then start at an instant $t_5$, marking the end of interval $dt_2$, and will end at an instant $t_6$ leaving again an interval mp for the performance of part of the main program. This interval mp ends at an instant $t_4'$, corresponding to the trailing edge of the next pulse $S_2$, which initiates another transfer interval $dt_2'$.

Not indicated in FIG. 2 is a possible delay in the start of a transfer interval $dt_1$ or $dt_2$ due to the fact that, upon the arrival of a pulse $S_1$ or $S_2$ at microprocessor IOP, the latter is still engaged in executing a microinstruction pertaining to the transfer of data between memories MEMD and MMB via transceiver TRC1. Such a delay, which is relatively short, expedites overall operation by avoiding the need for interim storage of data or addresses pertaining to the main program.

Figure 3:
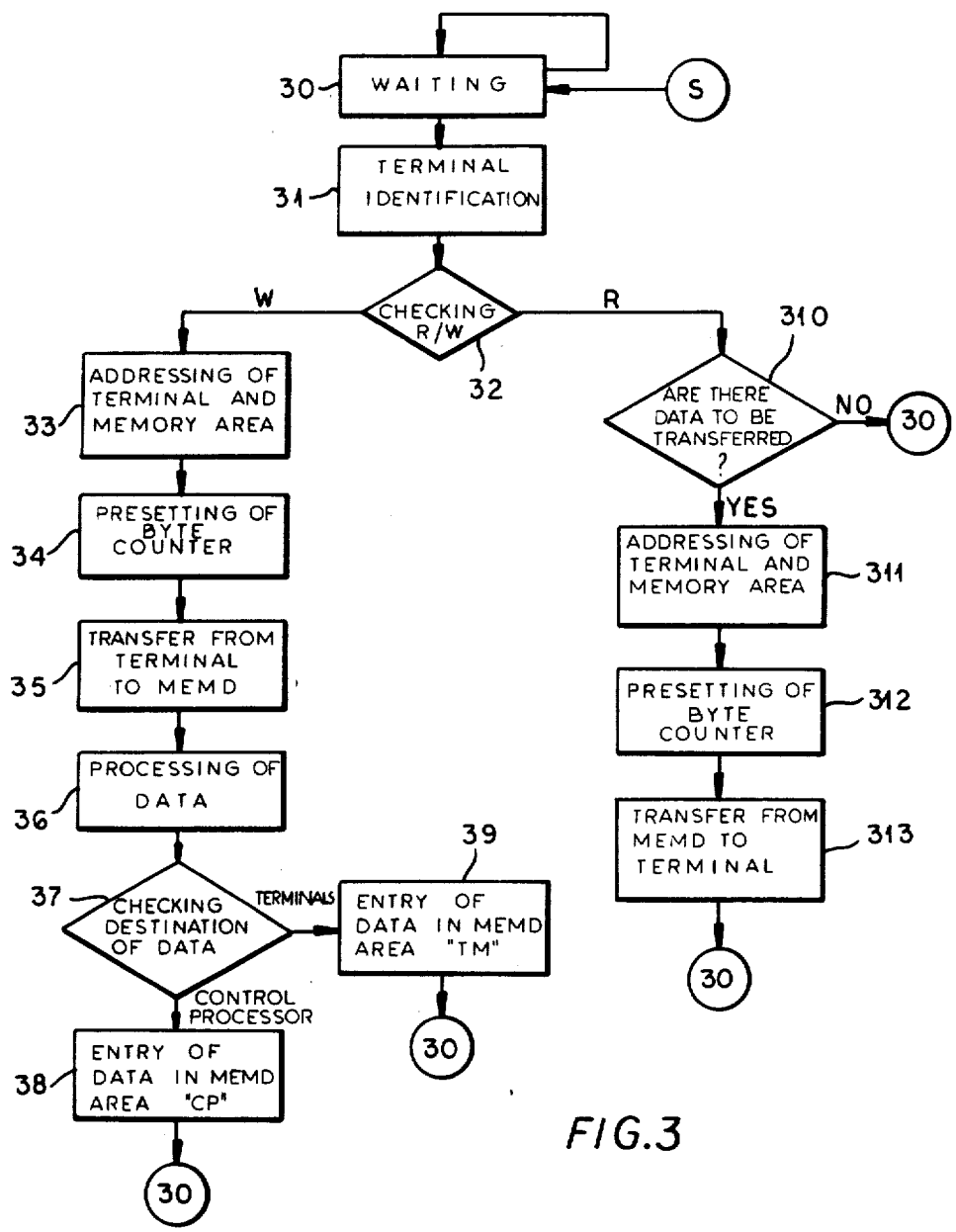
FIG. 3 is a flow chart of part of a program implemented by the interface in accordance with our invention.

The flow diagram of FIG. 3 represents that portion of the interface program—implemented by microprocessor IOP—which relates to data transfer between terminals $TM_1$, $TM_2$ and memory MEMD. Such a transfer, as will be apparent from the foregoing description, is either the first or the last stage of a three-stage transmission from a terminal to processor CP or vice versa, being either followed or preceded by an intermediate stage involving transfer between memories MMB and MEMD. The latter memory, it should be noted, comprises separate areas for the storage of data destined for the processor or for a terminal.

A first step 30 in the flow chart of FIG. 3 represents a waiting phase, coinciding with one of the intervals mp of FIG. 2, in which a portion of the main program is being carried out. This phase is maintained for a number of clock cycles of time base CG until the arrival of an access request S (which could be either a pulse $S_1$ or a pulse $S_2$) whereupon the microprocessor interrupts the main program at the end of a microinstruction in progress, as noted above, and identifies in a step 31 the terminal $TM_1$ or $TM_2$ from which the request has originated. An inquiry 32 then determines whether the request is for writing (W) or reading (R), i.e. for a transfer from or to the originating terminal.

In the event of a writing request W, microprocessor IOP instructs program meory MEMP in a step 33 to address, via driver DR, the involved terminal and the memory area thereof which is to emit the data. Next, in a step 34, a counter in the microprocessor is preset according to the number of bytes—read out from memory MEMP —to be extracted from the terminal during the current transfer interval; that counter is stepped by the clock pulses of time base CG. There follows, in a step 35, the actual transmission of the bytes via transceiver TRC0 to bus BL for loading into memory MEMD. A possible intermediate processing of the data in component IOP—e.g. to adapt their format to the requirements of their destination—is indicated by a step 36; an omission of this step shortens the procedure. The extraction of data from the terminal ends when the byte counter has reached the number of cycles preset therein. An inquiry 37 determines whether the extracted data are destined for the processor CP or for the other terminal. In the first instance they are loaded in a step 38 into an area "CP" of memory MEMD, assigne to the processor, whereas in the second instance they are entered in an area "TM" of that memory assigned to the terminals. Each of these last two steps is followed by a return to the waiting phase 30 which, however, may immediately lead to step 31 if another access request has arrived in the interim.

If inquiry 32 ascertains a reading request R, the microprocessor determines in another inquiry 310 whether data destined for the requesting terminal are available in the corresponding area of memory MEMD. If not, the interface returns to the waiting phase 30. Otherwise, the microprocessor instructs program memory MEMP in a step 311 to address the memory area of that terminal which is to receive the available data. Next, the byte counter is preset in a step 312 whereupon transfer from memory MEMD to the terminal takes place in a step 313 until that counter has run its course. There follows again a return to waiting phase 30.

The transfer of data from memory MEMD to memory MMB or vice versa in the intermediate stage referred to, within an interval mp, proceeds with the aforedescribed modality by way of transceiver TRC1. Each memory MEMD and MMB may have a certain cell which is periodically read by the microprocessor and contains information on the location within that memory of data to be transferred to the respectively other memory; this speeds up the readout since the microprocessor need not scan all those locations for their contents. Alternatively, buffer memory MMB need not be accessed for readout unless processor CP informs component IOP (via the aforedescribed path including circuits ARB1, ARB2 and bus BA) that data have been written in a particular location thereof. In either case, and as already noted, an exchange of data between the processor and the buffer memory is inhibited as long as data are loaded into or extracted from that memory via transceiver TRC1 under the control of microprocessor IOP.

Figure 4:
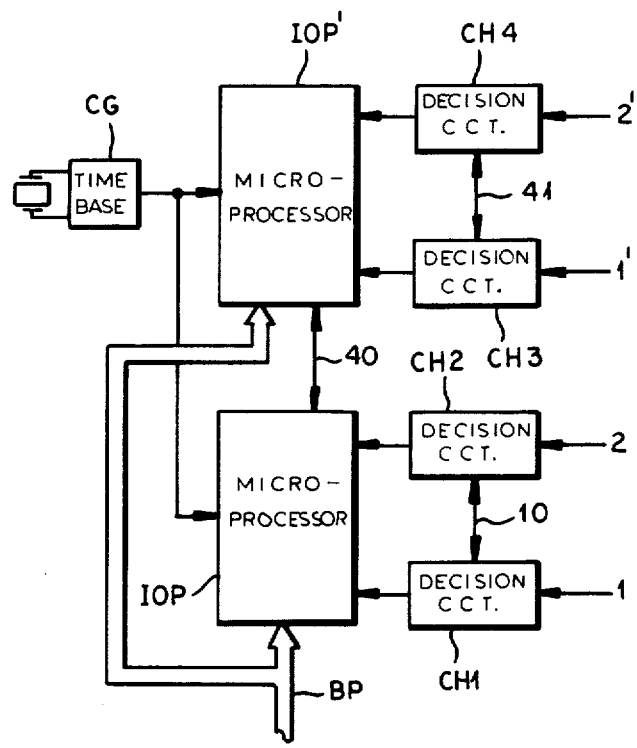
FIG. 4 is a block diagram showing a partial modification of the structure of FIG. 1.

In FIG. 4 we have shown a partial modification of the interface of FIG. 1 with addition of a second microprocessor IOP' controlled by time base CG and communicating with microprocessor IOP through a bidirectional link 40. Component IOP' receives access requests $S_3$ and $S_4$ from a nonillustrated second pair of terminals, connected to bus BT, having output leads 1' and 2' respectively terminating at two further decision circuits CH3 and CH4. These latter circuits are interconnected by a link 41 and, in a manner analogous to that described for circuits CH1 and CH2, prevent the simultaneous transmission of two request pulses to component IOP' while giving priority to, say, pulses $S_3$ in the case of their coincidence with pulses $S_4$. Connection 40 similarly establishes an order of precedence between the two microprocessors, as by giving priority to component IOP over its mate IOP'.

It will be apparent that the number of terminals or terminal pairs is limited by the length of a recurrence period and the time needed for data transfer since, as stated with reference to FIGS. 1 and 2, the sum of all transfer intervals must be less than a recurrence period so as to leave time for execution of a portion of the main program.

An interface according to our invention can be used, for example, in a satellite communication system disclosed in commonly owned application Ser. No. 572,578, now U.S. Pat. No. 4,555,782, filed by us jointly with another on even date herewith.

We claim:

1. In a data-handling system wherein a processing unit dialoguing with a plurality of terminals carries out a main program in a temporally uncorrelated manner, with emission and acquisition of data by said processing unit at irregular intervals via an asynchronic two-way bus to each of said terminals, each of said terminals emitting periodically recurring access requests over a common synchronous two-way bus to said processing unit with a minimum recurrence period accommodating a data transfer involving each of said terminals.

the combination therewith of an interface with input/output connections to both said asynchronous bus and said synchronous bus, whereby said interface controls bidirectional transfer of data between said asynchronous bus and said synchronous bus to avoid congestion, said interface comprising:

receiving means connected to said synchronous bus for detecting access requests from any of said terminals;

decision means connected to said receiving means for establishing an order of succession among simultaneously arriving requests from said plurality of terminals;

microprocessing means connected to said decision means for controlling said data transfer between said synchronous bus and said asynchronous bus;

a two-way synchronous internal bus connected to said microprocessing means;

memory means connected to said asynchronous bus and said two-way synchronous internal bus;

first arbitration means for establishing communication of said memory means with said two-way synchronous internal bus in response to instructions from said microprocessing means with simultaneous cutoff of said memory means from said asynchronous bus; and second arbitration means for establishing communication of said memory means with said asynchronous bus in response to instructions from said processing unit, with simultaneous cutoff of said memory means from said two-way synchronous bus.

2. The combination defined in claim 1 wherein said buses have multiple leads for bidirectinal parallel transmission of bits of a multibit data word being transferred.

3. The combination defined in claim 1 wherein said microprocessing means is responsive to the arrival of an access request from any of said terminals for commanding a termination of communication of said memory means with said internal bus, while enabling said memory means to be accessed by said processing unit through said asynchronous bus, for duration of a data transfer between the requesting terminal and said data memory.

* * * * *